Feb. 14, 1939.   E. C. FRISK   2,147,024
BREAD RAISING CABINET
Filed Dec. 18, 1936   2 Sheets-Sheet 1
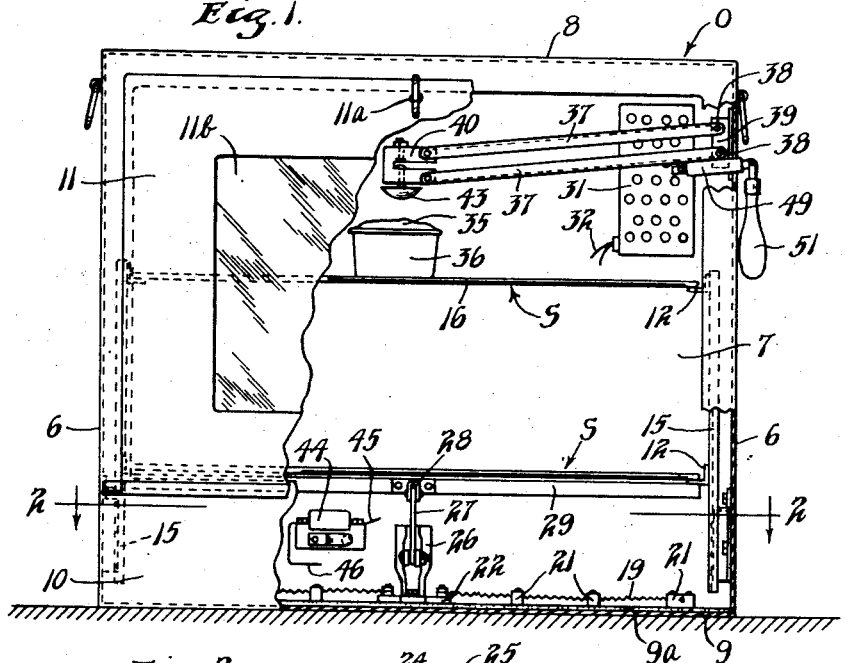
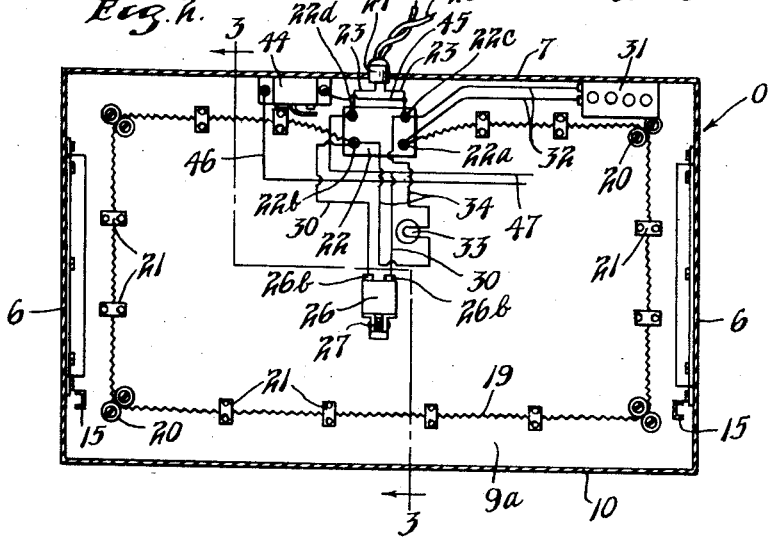
INVENTOR.
ENOS C. FRISK.
BY HIS ATTORNEYS.
Williamson & Williamson Feb. 14, 1939. E. C. FRISK 2,147,024
BREAD RAISING CABINET
Filed Dec. 18, 1936 2 Sheets-Sheet 2
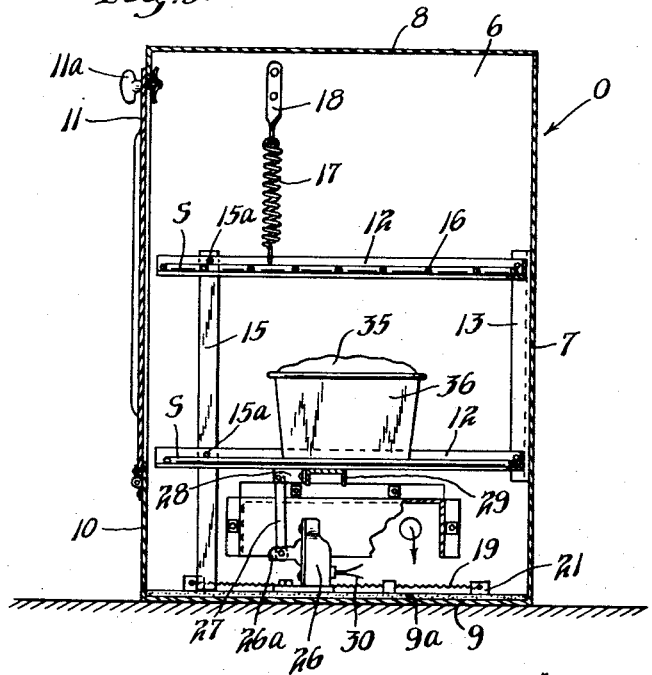
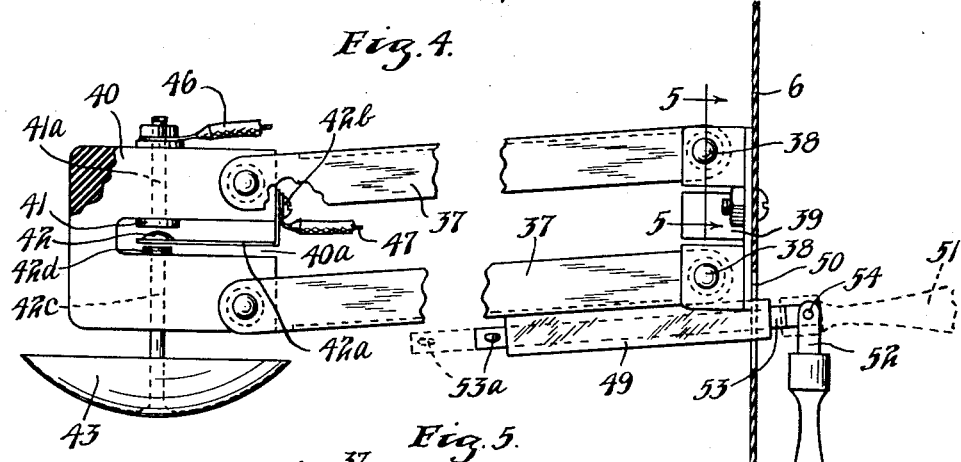
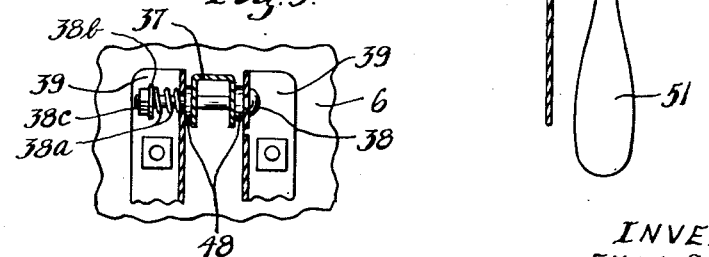
INVENTOR.
ENOS C. FRISK.
BY HIS ATTORNEYS
Williamson & Williamson Patented Feb. 14, 1939

2,147,024

UNITED STATES PATENT OFFICE 2,147,024

BREAD RAISING CABINET

Enos C. Frisk, Somerset, Wis.

Application December 18, 1936, Serial No. 116,543

2 Claims. (Cl. 177—311)

My invention relates to dough raising cabinets for the raising of bread dough, biscuit dough, etc.

It has been found that superior results may be obtained in the raising of bread dough if the dough is maintained at a suitable temperature until such time as the bread has raised to the desired extent. In connection with domestic bread making suitable means for maintaining such conditions is not usually available.

An object of my invention is to provide apparatus for domestic use in effectively and economically maintaining bread dough at a temperature conducive to the best results during raising of the dough.

A more specific object is to provide a bread-raising or dough-proofing cabinet including automatic means for so controlling heating means therefor that a substantially constant predetermined temperature will be maintained while dough is disposed in the cabinet and no heat will be produced when no dough is in the cabinet.

Another object is to provide such a cabinet including indicating means for automatically indicating when dough therein has raised to a predetermined extent.

Still another object is to provide a cabinet including such indicating means which is adjustable to accommodate various thicknesses of dough and to produce an indication on attainment of various degrees of raising of the dough.

A further object is to provide such a cabinet of simple, compact, light and inexpensive construction.

These and other objects and advantages of the invention will be more fully set forth in the following description made in connection with the accompanying drawings, in which like reference characters refers to similar parts throughout the several views, and, in which:—

Fig. 1 is a partially broken away front view of a cabinet embodying my invention;

Fig. 2 is a horizontal sectional view taken along the line 2—2 of Fig. 1, as indicated by the arrows and diagrammatically showing the electrical connections involved in my cabinet;

Fig. 3 is a vertical sectional view taken along the line 3—3 of Fig. 2, as indicated by the arrows;

Fig. 4 is a broken view to enlarged scale of a portion of the automatic indicating means of my cabinet; and Fig. 5 is a sectional view taken along the line 5—5 of Fig. 4, as indicated by the arrows.

Referring to the drawings, my invention is shown incorporated in a cabinet O. While this cabinet may be of various forms, I have shown a cabinet with rectangular side walls 6, rear wall 7, top wall 8, bottom wall 9 and front wall 10. The front wall 10 extends from the lower limits of the cabinet only a short distance upwardly and above the same. A cabinet door 11 is provided hinged at its lower edge to the front wall 10 and provided at its upper edge with a latch 11a. Preferably the door 11 is provided with a transparent central portion 11b, through which a view of the interior of the cabinet is afforded. The lower wall 9 is provided with a lining 9a thereabove, preferably formed of material resistent to heat and constituting electrical insulation.

Means is provided within the cabinet O for supporting materials to be heated therein. For this purpose, I provide shelves or platforms which are deflectable upwardly and downwardly. The platforms consist of frames 12 located one above the other, as shown, and pivotally connected at their rear edge portions to vertical members 13 secured to the inner side of the rear wall 7 of the cabinet O. The frame 12 is obviously angularly swingable upwardly and downwardly. Means is provided whereby the respective frames 12 will be deflected upwardly and downwardly in unison. For this purpose, vertical members 15 are provided and are pivotally connected to the respective frames 12 by pivot pins 15a. The vertical elements 15 are located at the forward portions of the end edges of the frame 12 and extend downwardly to points closely adjacent the lower wall 10. Panels 16 formed of recticulated material, such as an assembly of cross bars forming grids are removably supported by the frames 12. Yieldable means is provided to urge the frames 12 upwardly. For this purpose, I provide helical tension springs 17 disposed adjacent the respective ends of the upper one of the frames 12 and connected between the ends of the frames 12 and anchoring elements 18 disposed thereabove and secured to the respective end walls 6 of the cabinet O.

Means is provided for heating the inner space of the cabinet O, and preferably such means consists of an electrical heating element. An electrical heating element 19, in the form of a helical coiled piece of resistance wire of relatively low capacity, is mounted just above the lining 9a of a bottom wall 9. This heating element is supported by spools 20 and cleats 21 disposed, as shown, and suitably secured to the lining 9a. A terminal block 22 is provided at the rear of the cabinet O and is secured to the lining 9a. The terminal block 22 includes four terminals 22a, 22b, 22c and 22d. The respective ends of the heating elements 19 are connected to the respective terminals 22a and 22b and the respective terminals 22c and 22d are connected through wires 23 and an electrical fitting 24 to an electrical cord 25, which is adapted to be connected to a suitable source of electrical energy.

Means is provided responsive to upward and downward deflection of the shelves S for closing the supply circuit to the heating element 19 when the shelves S are moved downwardly and opening the circuit when the shelves S are moved upwardly. For this purpose, a switch 26 is mounted on the lining 9a below the lower shelf S. This switch is preferably of the toggle type having a vertically movable operating toggle or handle 26a. The switch handle 26a is connected through a link 27 to an element 28 mounted on a cross member 29 secured to the lower side of the frame 12 of the lower shelf S. The switch 26 is so arranged as to be open when the handle 26a is in its upper position and closed when the handle 26a is in its lower position. Terminals 26b of the switch 26 are connected through wires 30 to the respective terminals 22b and 22d of the terminal block 22. With the terminals 22a and 22c of the terminal block 22 connected together by means to be described later, it will be seen that the switch 26 will control the delivery of electrical energy to the heating element 19.

Means is provided for so controlling the heating element 19 when the switch 26 is closed, that the heating element 19 will be alternately energized and de-energized in such manner that a substantially constant predetermined temperature will be maintained within the cabinet O. For this purpose, a thermostatically operated electrical device 31 is mounted on the upper portion of the rear wall 7 of the cabinet O so as to be subject to the temperatures prevailing in the interior space of the cabinet O. The thermostatic device 31 is connected through wires 32 to the respective terminals 22a and 22c of the terminal block 22, whereby the thermostatic device 31 may control the delivery of the electric energy to the heating element 19 during such periods of time as the switch 26 is in closed position. Means is provided for indicating the position of the switch 26. For this purpose, an indicating lamp 33 is connected through wires 34 to the respective terminals 22b and 22c of the terminal block 22. With such connections, it should be apparent that the lamp 33 will be controlled by the switch 26 independently of the thermostat 31. The lamp 33 is preferably located in the lower portion of the interior of the cabinet O and may be mounted in a conventional manner on the lining 9a.

From the above, it is seen that the heating element 19 will be energized only when the shelves S are in a downwardly displaced position and at such times will be controlled by the thermostat 31 to maintain a substantially constant temperature in the cabinet O. Material to be heated in the cabinet O, such as dough 35 contained in pans 36, may be placed upon the upper shelf S, as shown in Fig. 1, and the lower shelf S, as shown in Fig. 3. The springs 17 are of such strength that the weight of materials to be heated in the cabinet O may readily deflect the shelves S downwardly to cause closure of the switch 26. The lower ends of the members 15 project downwardly to such a distance that the same will constitute stops for limited downward movement of the shelves S to only sufficient magnitude to cause operation of the switch 26. When the pans 36 of dough 35 are removed from the shelves S, the springs 17 will pull the shelves S upwardly.

Upward movement of the shelves S will be limited by the toggle handle 26a of the switch 26 reaching its upward limit of movement. Thus portions of the switch 26 constitute stop means for limiting upward movement of the shelves S.

The primary object of my oven is the raising of bread dough, such as the dough 35 in the pans 36, and I provide means for automatically producing a signal or indication when the dough has raised to a predetermined extent. I also so construct the indicating means that the same may be adjustable to provide for bodies of dough of different thicknesses and to provide for giving a signal upon the attainment of various degrees of raising the dough 35. Generally stated, the indicating means referred to consists of an electrical indicating device of suitable form controlled by electrical contacts which are actuated by a vertical shiftable element, positioned to be engaged and lifted by the dough 35, when the same has raised to a predetermined extent. While such indicating apparatus may be constructed in various ways, I prefer to use the construction shown in the drawings. I provide a pair of parallel elongated elements 37 which are disposed one above the other and extend generally in a horizontal direction. The inner ends of the elongated elements 37 are pivotally connected by means of pivot bolts 38 to supporting elements 39 secured to the inner side of the upper portion of one of the end walls 6. The parts described are so arranged that the elongated elements 37 extend to a point centrally located a moderate distance above the upper shelf S and are angularly deflected upwardly and downwardly. The outer ends of the elongated elements 37 are shiftably connected to a frame 40 wherein an electric contact structure or switch is provided, as will be described. The elongated elements 37, the supporting elements 39 and the frame 40, together constitute an upwardly and downwardly shiftable arm of parallelogram form.

The frame 40 may consist of a block of electrical insulating material. The block 40 is provided with a slot 40a extending from the front to rear thereof medially between the upper and lower limits thereof and facing toward the elongated elements 37. An upper contact 41 is placed against the portion of the block 40 defining the upper limits of the slot 40a. The contact 41 carries a terminal stud 41a extending through the upper portion of the block 40, as shown. The lower contact 42 is carried by a resilient metallic finger 42a which is secured to the block 40 by means of a terminal screw 42b. Below the contact 42, is a plunger 42c disposed vertically in an aperture extending vertically through the lower portion of the block 40 so that the plunger 42c may be shifted vertically to close the contacts 41 and 42. A pin 42d is disposed in a diametrical aperture in the plunger 42c to constitute stop means for limiting downward movement of the plunger 42c. The lower end of the plunger 42c carries an element 43 adapted for engagement by dough raising therebelow. The element 43 is preferably of such shape that its downwardly facing side is of convex nature, as shown. The contacts 41 and 42 are utilized to control an electrical circuit from the power supply cord 25 to a buzzer 44 mounted within the cabinet O. The buzzer is connected through a wire 45 to one of the wires 23 and through another wire 46 to the terminal stud 41a. The terminal screw 42b is connected through a wire 47 to the remaining one of the wires 23, whereby a circuit from the power supply cord 25 to the buzzer 44 will be completed through the pair of contacts 41 and 42 when the same are closed.

As described above, the arm comprising the elongated elements 37 is angularly deflectable upwardly and downwardly and it should be apparent that the parallelogram construction described will result in the block 40 moving vertically upwardly without tilting. Means is provided for yieldingly holding the elongated elements 37 in a vertically adjusted position thereof. For this purpose, friction washers 48 are provided between one of the elements 37 and the respective supporting elements 39 in encircling relation with the pivot bolt 38, as shown in Fig. 5.

To place pressure on the frictional pivot joint described above, a helical compression spring 38a is placed in encircling relation with the pivot bolt 38 outwardly of and in abutment with one of the supporting elements 39 and bearing at its outer end against a washer 38b disposed inwardly of a nut 38c on the threaded outer end of the bolt 38, as shown.

Means is provided externally of the cabinet O for adjustively shifting the elongated elements 37. A tubular element 49 is secured to one of the elongated elements 37 near the inner end thereof and in substantially parallel relation thereto. The end wall 6 on which the elongated elements 37 are mounted is apertured at 50 to accommodate an end portion of the tubular element 49 projecting therethrough. A handle 51 is provided having a shank consisting of one portion 52 attached to the handle 51 and another portion 53 swingably connected to the first portion 52 by means of a pivot pin 54. The portions 52 and 53 are arranged at the ends thereof receiving the pivot pin 54, so that the portions 52 and 53 may be brought into axial alignment with each other. For this purpose, one of the elements 52 and 53 is forked and the other is diminished in thickness at the pivotal joint. The normal position of the handle and its shank portions 52 and 53 is shown in full lines in Fig. 4. The same are in an outwardly disposed position, whereby the handle 51 and shank portion 52 may depend from the shank portion 53. A stop pin 53a is provided in the inner end of the shank portion 53 to prevent withdrawal of the same from the tubular element 49. When it is desired to adjust the position of the elongated elements 37, the handle 51 is raised to a position wherein the shank portions 52 and 53 are in axial alignment. Then the handle 51 is thrust inwardly so that the pivotal joint and at least a portion of the shank element 52 is received in the tubular element 49. The parts are then disposed as shown in dotted lines in Fig. 4, and the shank portion 52 and the handle 51 are in substantially rigid relation to the tubular element 49 and the elongated elements 37, whereby the handle 51 may be manipulated to raise and lower the elongated elements 37 and the switch device carried by their outer ends.

In the normal use of the above described apparatus, pans 36 containing dough 35 may be placed on the shelves S, whereby the switch 26 will be closed. The arms 37 are then adjusted to a suitable level above a pan of dough disposed under the convex element 43. The level at which the convex element 43 is adjustably positioned is determined by the thickness of the body of dough 35 and the extent to which the dough is desired to raise in order to produce an indicating operation of the buzzer 44. The cabinet may then be left unattended and through apparatus previously described will be maintained at a substantially constant temperature. The thermostatic element 31 should be adjusted to maintain a temperature conducive to the best results in raising of the dough 35. When the buzzer operates, the user of the cabinet will thus be advised that the raising process has been completed and may thereupon remove the pans 36 from the cabinet. Removal of the pans 36 from the cabinet will, of course, automatically cause opening of the switch 26 to prevent further energization of the heating element 19.

When particularly large dough-containing receptacles are to be placed in the cabinet O, as in the case of partial raising of an entire batch of dough before dividing the same and placing in loaf size pans, the upper panel or grid 16 may be removed and the large receptacles may be placed on the lower grid 16.

It is to be understood that the cabinet O may, if desired, be comprised in the structure of a cooking range or the like.

My dough-raising cabinet described above has been found to be very effective, highly efficient in the consumption of electrical energy, and reliable in operation.

It is apparent that I have invented a novel, effective and inexpensive form of dough-raising cabinet including means for automatic temperature control and automatic indications. While the apparatus has been described and illustrated in a form adapted particularly to raising of dough, it should be apparent that the apparatus is easily adaptable for use in other processes wherein heating of materials is involved.

It will, of course, be understood that various changes may be made in the form, details, proportions and arrangements of the parts without departing from the scope of my invention, which, generally stated, consists in a device capable of carrying out the objects above set forth, and in the novel parts and combinations of parts disclosed and defined in the claims.

What is claimed is:—

1. A dough raising cabinet comprising a door equipped casing, an electrical heating element of relatively low capacity within said casing for maintaining the interior of the cabinet at a proper temperature for dough raising, dough supporting means within said cabinet, an electrical switch associated with said dough supporting means and said electrical heating element and operable to close an electrical circuit to said heating element upon the deposit of dough through said door on said supporting means, thermostatic means within said cabinet associated with said heating element for controlling the same to maintain a substantially constant predetermined temperature within said cabinet during periods when said switch is closed, an alarm device and upwardly deflectable means for actuating said alarm device disposed above said dough supporting means to be actuated by dough thereon when the dough has raised sufficiently to engage and deflect said deflectable means, said deflectable means being vertically adjustable in position relative to said dough supporting means.

2. A dough raising cabinet comprising a door equipped casing, an electrical heating element of relatively low capacity within said casing for maintaining the interior of the cabinet at a proper temperature for dough raising, a dough supporting shelf disposed within said cabinet and mounted for vertical deflection within limits, resilient means normally holding said shelf at its upper limit of deflection and yieldable to permit downward deflection of said shelf to its lower limit of deflection responsive to placement of dough thereon, an electrical switch operated by deflection of said shelf and associated with said heating element in such manner that such heating element will be operative only while said shelf is in the downwardly deflected position thereof, thermostatic means within said casing and associated with said heating element for controlling the same to maintain a substantially constant predetermined temperature within said oven during periods when said switch is closed, an alarm device, an upwardly deflectable means for actuating said alarm device and disposed above said shelf to be actuated by dough thereon when said dough has raised sufficiently to engage and deflect said deflectable means, said deflectable means being vertically adjustable in position relative to said shelf.

ENOS C. FRISK.